US010738738B2

(12) United States Patent
Lu et al.

(10) Patent No.: US 10,738,738 B2
(45) Date of Patent: Aug. 11, 2020

(54) NACELLE WITH BIFURCATION EXTENSION AND INTEGRAL STRUCTURAL REINFORCEMENT

(71) Applicant: Rohr, Inc., Chula Vista, CA (US)

(72) Inventors: Jinqiu Lu, Murrieta, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 768 days.

(21) Appl. No.: 15/185,952

(22) Filed: Jun. 17, 2016

(65) Prior Publication Data

US 2017/0362957 A1 Dec. 21, 2017

(51) Int. Cl.
*F02K 1/82* (2006.01)
*F02K 1/72* (2006.01)
*F01D 25/24* (2006.01)
*B64D 29/06* (2006.01)

(52) U.S. Cl.
CPC .............. *F02K 1/827* (2013.01); *B64D 29/06* (2013.01); *F01D 25/24* (2013.01); *F02K 1/72* (2013.01); *F05D 2260/963* (2013.01); *Y02T 50/672* (2013.01)

(58) Field of Classification Search
CPC ........... B29B 11/16; B64C 7/02; B64D 27/26; B64D 29/00; B64D 29/06; F01D 25/04; F01D 25/24; F01D 25/246; F01D 25/26; F05D 2300/701; F05D 2240/14; F02K 1/72; F02K 1/827; F02K 3/02; Y02T 50/672
See application file for complete search history.

(56) References Cited

U.S. PATENT DOCUMENTS

| 4,585,189 A | 4/1986 | Buxton |
| 4,697,763 A | 10/1987 | Vermilye |
| 5,083,426 A * | 1/1992 | Layland ............... F02K 1/78 428/116 |
| 5,350,136 A | 9/1994 | Prosser et al. |
| 5,372,338 A | 12/1994 | Carlin et al. |
| 5,482,429 A * | 1/1996 | Penda ............... F01D 21/045 415/119 |
| 6,340,135 B1 | 1/2002 | Barton |

(Continued)

OTHER PUBLICATIONS

Tuskegee University Alabama (Approved for public release: Feb. 2, 2004). Excerpt from "Innovative Manufacturing and Structural Analysis of Composite Isogrid Structures for Space Applications".*

*Primary Examiner* — Justin D Seabe
*Assistant Examiner* — Jesse M Prager
(74) *Attorney, Agent, or Firm* — Getz Balich LLC (57) ABSTRACT

A nacelle for an aircraft propulsion system includes a core cowl portion, a bifurcation portion and an extension portion. The core cowl portion extends about a centerline to the bifurcation portion. The bifurcation portion is connected to and extends radially between the core cowl portion and the extension portion. The extension portion projects out from the bifurcation portion and circumferentially extends over the core cowl portion. The extension portion includes an acoustic panel and a structural reinforcement. The acoustic panel includes a cellular core between a perforated face skin and a back skin, wherein the face skin is radially inboard of the back skin. The structural reinforcement is bonded to the back skin and structurally reinforces the acoustic panel.

14 Claims, 13 Drawing Sheets

(56) References Cited

U.S. PATENT DOCUMENTS

| | | | | |
|---|---|---|---|---|
| 8,322,653 B2 * | 12/2012 | Welch | ............... | B21D 39/03 |
| | | | | 239/265.25 |
| 8,627,644 B2 | 1/2014 | Vauchel | | |
| 8,899,917 B2 | 12/2014 | Bajusz et al. | | |
| 9,168,716 B2 * | 10/2015 | Benedetti | ............ | B32B 15/01 |
| 9,902,126 B2 * | 2/2018 | Biset | .................. | B32B 5/12 |
| 2008/0016844 A1 | 1/2008 | Shutrump | | |
| 2013/0161415 A1 | 6/2013 | Bellanger et al. | | |
| 2014/0027602 A1 * | 1/2014 | Layland | ............ | B64D 27/26 |
| | | | | 248/554 |
| 2014/0030087 A1 * | 1/2014 | Soria | ................... | F02K 1/72 |
| | | | | 415/213.1 |
| 2014/0145060 A1 | 5/2014 | Le Boulicaut | | |
| 2015/0108250 A1 | 4/2015 | Aten | | |
| 2015/0292413 A1 * | 10/2015 | Soria | ................... | F02K 1/827 |
| | | | | 181/290 |

* cited by examiner

NACELLE WITH BIFURCATION EXTENSION AND INTEGRAL STRUCTURAL REINFORCEMENT

BACKGROUND OF THE INVENTION

1. Technical Field

This disclosure relates generally to an aircraft propulsion system and, more particularly, to a nacelle for an aircraft propulsion system.

2. Background Information

A nacelle for an aircraft propulsion system typically includes multiple acoustic panels to attenuate noise generated by the propulsion system. While known acoustic panel arrangements have various benefits, there is still room in the art for further noise reduction and/or more structurally robust/lower cost nacelle configurations.

SUMMARY OF THE DISCLOSURE

According to an aspect of the present disclosure, a nacelle is provided for an aircraft propulsion system. This nacelle includes a core cowl portion, a bifurcation portion and an extension portion. The core cowl portion extends about a centerline to the bifurcation portion. The bifurcation portion is connected to and extends radially between the core cowl portion and the extension portion. The extension portion projects out from the bifurcation portion and circumferentially extends over the core cowl portion. The extension portion includes an acoustic panel and a structural reinforcement. The acoustic panel includes a cellular core between a perforated face skin and a back skin, wherein the face skin is radially inboard of the back skin. The structural reinforcement is bonded to the back skin and structurally reinforces the acoustic panel.

According to another aspect of the present disclosure, another nacelle is provided for an aircraft propulsion system. This nacelle includes an inner fixed structure, a metal hinge beam and a translating sleeve. The inner fixed structure extends along a centerline and includes a bifurcation portion and an extension portion. The extension portion projects circumferentially out from a radial outer end of the bifurcation portion. The extension portion includes an acoustic panel and a composite structural reinforcement bonded to and structurally reinforcing the acoustic panel. The metal hinge beam is mechanically attached to the structural reinforcement. The translating sleeve segment is axially translatably connected to the hinge beam. A bypass flowpath is formed radially within the extension portion and the translating sleeve segment and circumferentially next to the bifurcation portion.

The back skin may have a first thickness. The structural reinforcement may have a second thickness that is greater than the first thickness.

The structural reinforcement may be at least between a distal circumferential end of the extension portion and a corner between the extension portion and the bifurcation portion.

The structural reinforcement may circumferentially extend substantially along a width of the extension portion.

The structural reinforcement may axially extend along at least twenty-five percent of a length of the extension portion.

The structural reinforcement may include a base and a flange. The base may be bonded to the back skin. The flange may project radially out from the base.

The structural reinforcement may include a second flange that projects radially out from the base. The flange and the second flange may be disposed axially along the base.

A hinge beam may be included and attached to the base and the flange.

The hinge beam may include a beam, a flange mount and a hinge gusset extending between the beam and the flange mount. The beam may be mechanically fastened to the flange. The flange mount may be mechanically fastened to the base.

A translating sleeve segment may be included and slidingly connected to the hinge beam.

The extension portion may be configured from or otherwise include composite material. The hinge beam may be configured from or otherwise include metal.

The structural reinforcement may be configured from or otherwise include composite material.

A second bifurcation portion may be included. This second bifurcation portion may be connected to and project radially out from the core cowl portion. The core cowl portion may extend about the centerline between the bifurcation portion and the second bifurcation portion.

A translating sleeve segment may be included. This translating sleeve segment may extend about the centerline and may be connected to the extension portion and the second bifurcation portion. A flowpath may be formed circumferentially between the bifurcation portion and the second bifurcation portion, and radially between the core cowl portion and the extension portion and the translating sleeve segment.

The structural reinforcement may include a base and a flange. The base may be bonded to a back skin of the acoustic panel. The flange may project radially out from the base.

The structural reinforcement may include a second flange that projects radially out from the base. The flange and the second flange may be disposed axially along the base.

The hinge beam may include a beam and a mounting flange. The beam may be mechanically attached to the flange and the second flange. The translating sleeve segment may be axially translatably connected to the beam. The mounting flange may project out from the beam. The mounting flange may be axially between the flange and the second flange. The mounting flange may be mechanically attached to the base.

A second extension portion may be included and project out from the second bifurcation portion and circumferentially extend over the core cowl portion. The second extension portion may include a second acoustic panel. The second acoustic panel may include a cellular core between a perforated second face skin and a second back skin. The second face skin may be radially inboard of the second back skin.

The second extension portion may include a second structural reinforcement. The second structural reinforcement may be bonded to the second back skin and structurally reinforce the second acoustic panel.

The foregoing features and the operation of the invention will become more apparent in light of the following description and the accompanying drawings.

DETAILED DESCRIPTION OF THE INVENTION

Figure 1:
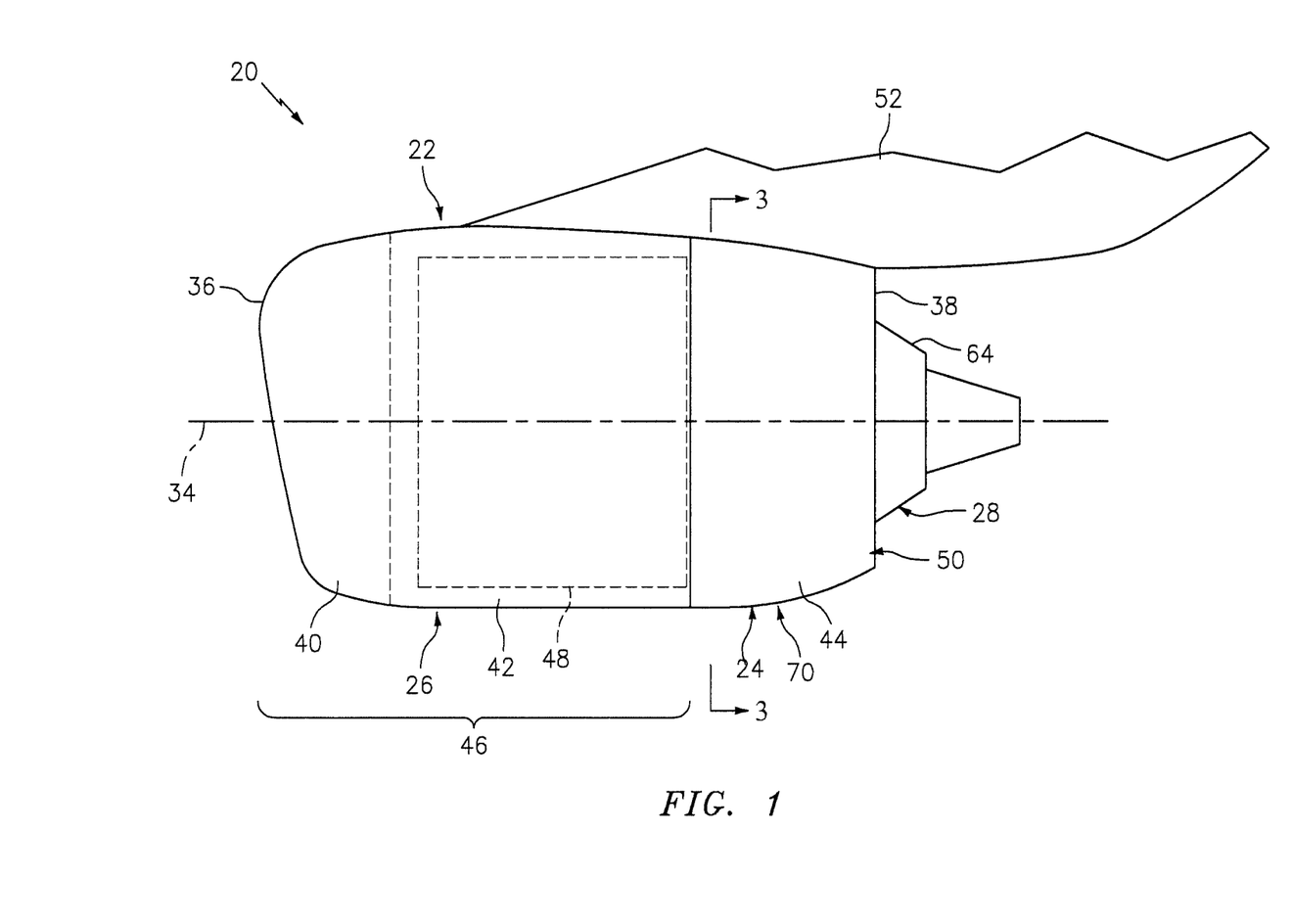
FIG. 1 is an illustration of an aircraft propulsion system with a translating sleeve in a stowed position.

FIG. 1 illustrates an aircraft propulsion system 20 for an aircraft such as a commercial airliner. The propulsion system 20 includes a nacelle 22 and a gas turbine engine. This gas turbine engine may be configured as a high-bypass turbofan engine as generally illustrated in FIG. 1. Alternatively, the gas turbine engine may be configured as any other type of gas turbine engine capable of propelling the aircraft. The propulsion system 20 also includes a thrust reverser system 24 configured with the nacelle 22; see also FIG. 2.

The nacelle 22 includes a nacelle outer structure 26 and a nacelle inner structure 28. The outer structure 26 is configured to house and provide an aerodynamic cover for a fan section of the gas turbine engine. The outer structure 26 is also configured to form a bypass flowpath 30 (see FIG. 3) with the inner structure 28 as described below in further detail. Briefly, a portion of air propelled aft by the fan section ("bypass air") is routed through the bypass flowpath 30 and out of the propulsion system 20, thereby bypassing a core 32 (see FIG. 3) of the gas turbine engine. This bypass air may provide a majority (e.g., more than 75%) of engine thrust in the case of a high-bypass turbofan engine.

The outer structure 26 extends along an axial centerline 34 between an outer structure forward end 36 and an outer structure aft end 38. The outer structure 26 includes an inlet structure 40 (e.g., module or cowl), a fan cowl 42 and one or more translating sleeves 44. The inlet structure 40 is disposed at the outer structure forward end 36. The inlet structure 40 is configured to direct a stream of air through an inlet opening at the outer structure forward end 36 and into fan section of the gas turbine engine.

Figure 3:
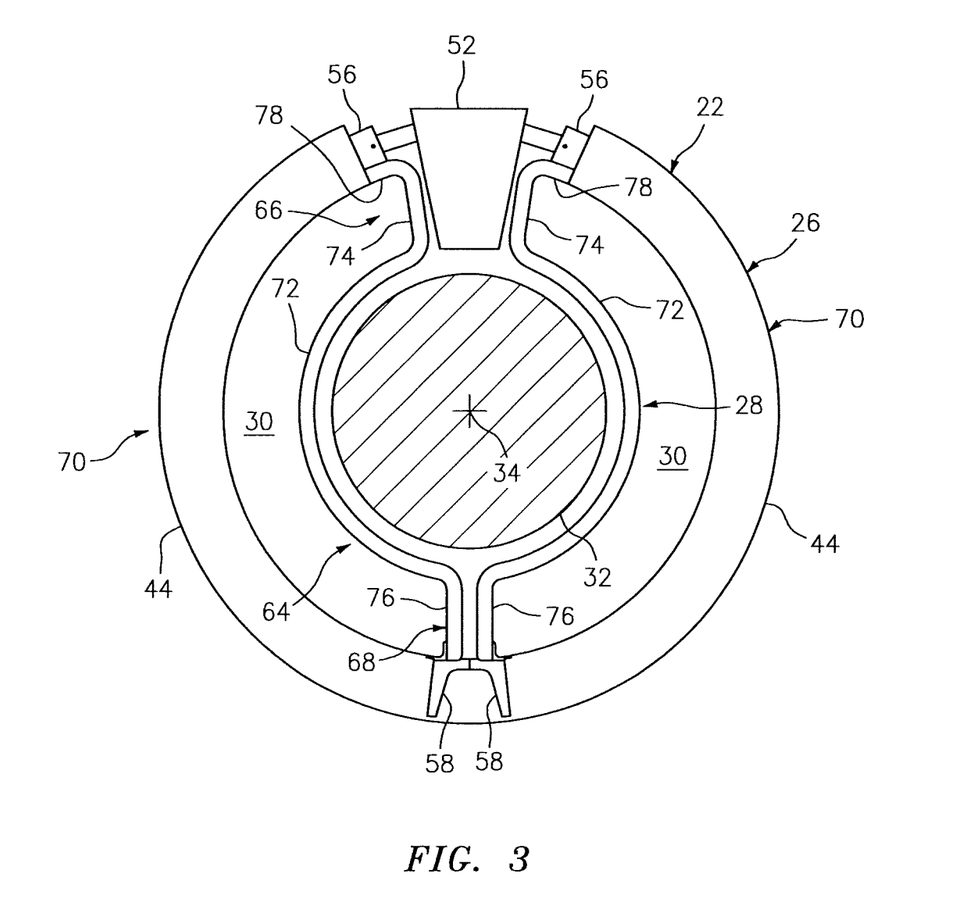
FIG. 3 is a schematic sectional illustration of the aircraft propulsion system with nacelle doors in a closed position.

The fan cowl 42 is disposed axially between the inlet structure 40 and the translating sleeve segment 44. The fan cowl 42 of FIG. 1, in particular, is disposed at an aft end of a stationary portion 46 of the outer structure 26, and extends forward to the inlet structure 40. This fan cowl 42 is generally axially aligned with the fan section of the gas turbine engine. The fan cowl 42 is configured to provide an aerodynamic covering for a fan case 48, which circumscribes the fan section and partially forms an outer peripheral boundary of the bypass flowpath 30. It should be noted, the term "stationary portion" is used above to describe a portion of the outer structure 26 which is stationary during propulsion system 20 operation (e.g., during takeoff, aircraft flight and landing). However, the stationary portion 46 may be translatable and/or otherwise movable for propulsion system 20 inspection/maintenance; e.g., when the propulsion system 20 is non-operational.

The translating sleeves 44 are disposed on opposing sides of the propulsion system 20 thereby providing a translating sleeve; thus, one of the sleeves 44 is hidden in FIG. 1. The translating sleeves 44 are disposed at the outer structure aft end 38. The translating sleeves 44 are configure to further partially form the outer peripheral boundary of the bypass flowpath 30 (see FIG. 3), which extends through the propulsion system 20 to a nozzle 50. The translating sleeves 44 may also form the nozzle 50 with the inner structure 28.

Figure 2:
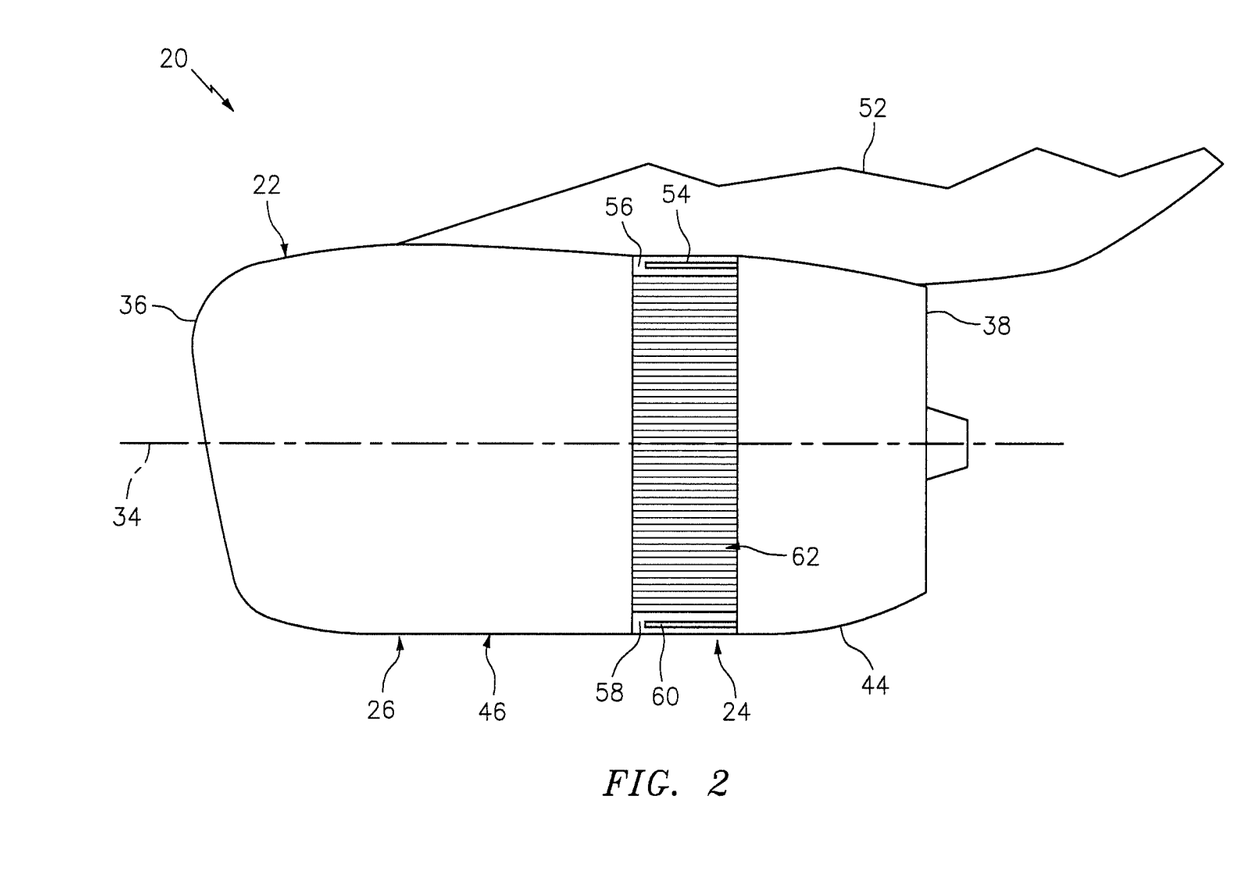
FIG. 2 is an illustration of the aircraft propulsion system with the translating sleeve in a deployed position.

Referring to FIGS. 1 and 2, the translating sleeves 44 are configured as translatable structures. A first end of each translating sleeve segment 44, for example, is slidably/translatably connected to a stationary structure 52 (e.g., a pylon) through one or more respective first rails 54 (see FIG. 2) on a respective pivotable track beam/hinge beam 56 (see FIG. 3). A second end of each translating sleeve segment 44 is slidably/translatably connected to a respective track beam 58 (see FIG. 3) through one or more respective second rails 60 (see FIG. 2). In this manner, each translating sleeve segment 44 may translate axially along the centerline 34 and relative to the stationary portion 46 of the outer structure 26. Each translating sleeve segment 44 may thereby move axially between a forward stowed position (see FIG. 1) and an aft deployed position (see FIG. 2). In the forward stowed position, the translating sleeve segments 44 provide the functionality described above. In the aft deployed position, the translating sleeve segments 44 at least partially (or substantially completely) uncover one of more other components of the thrust reverser system 24 such as, but not limited to, one or more cascade structures 62.

Referring to FIG. 3, the inner structure 28, which may also be referred to as an "inner fixed structure" or "IFS", includes a core cowl 64 and one or more bifurcations 66 and 68. This core cowl 64 is configured to house and provide an aerodynamic cover for the turbine engine core 32, which includes a compressor section, a combustor section and a turbine section. A forward portion of the core cowl 64 is axially overlapped by an aft portion (e.g., the translating sleeve segments 44) of the outer structure 26, thereby forming an aft portion of the bypass flowpath 30 and the nozzle 50. For example, the aft portion of the outer structure 26 extends axially over the forward portion of the core cowl 64.

The first (e.g., upper) bifurcation 66 is positioned at a first (e.g., 12 o'clock) position. This first bifurcation 66 bifurcates and extends radially through at least an axial portion of the bypass flowpath 30 between the core cowl 64 and the outer structure 26; e.g., the translating sleeve segments 44. The first bifurcation 66 may also house and provide an aerodynamic covering for one or more structural components securing the gas turbine engine to the pylon 52; see also FIG. 1.

The second (e.g., lower) bifurcation 68 is positioned at a second (e.g., 6 o'clock) position, which may be generally circumferentially opposite the first position as shown in FIG. 3. This second bifurcation 68 bifurcates and extends radially through at least an axial portion of the bypass flowpath 30 between the core cowl 64 and the outer structure 26; e.g., the translating sleeve segments 44.

Figure 4:
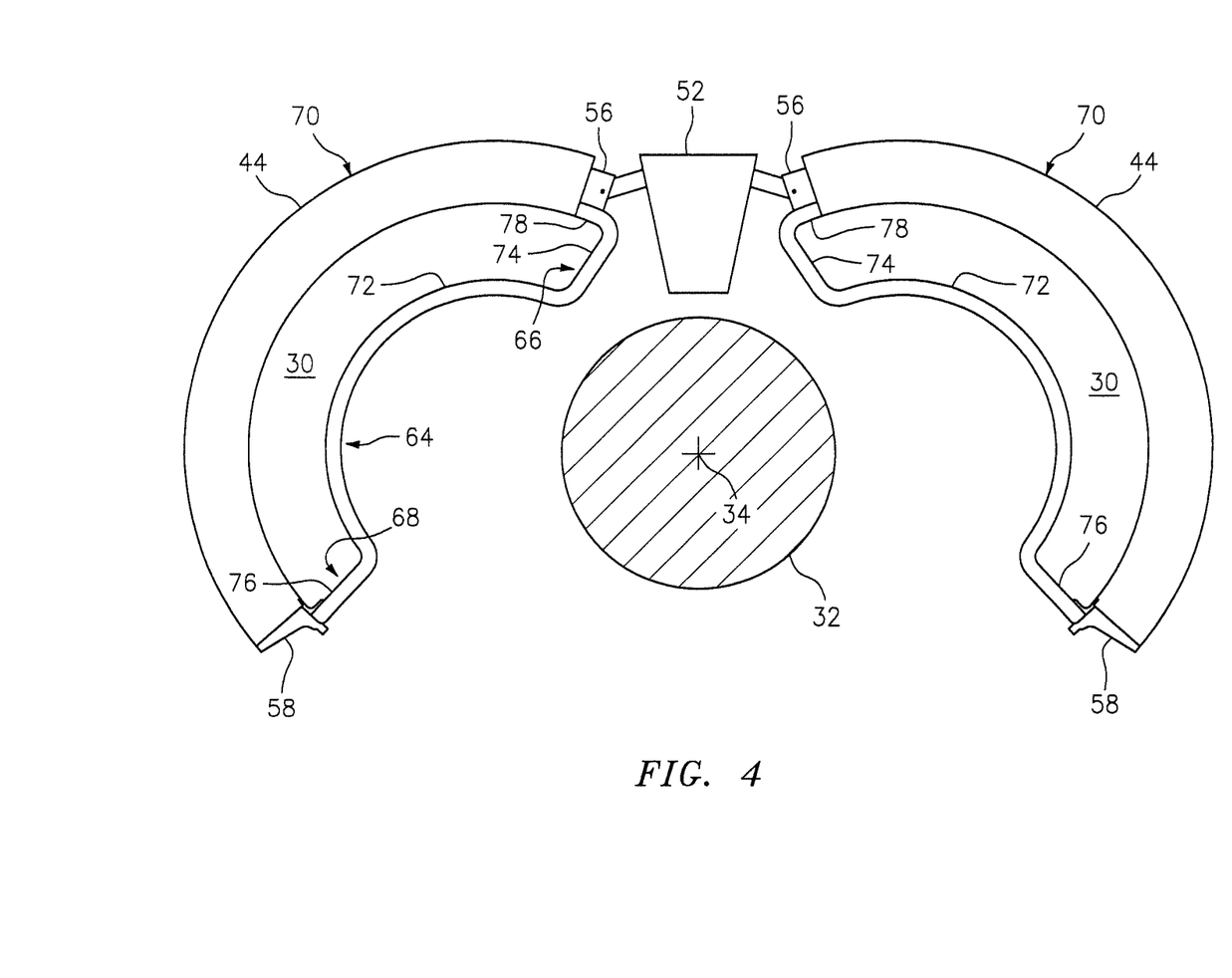
FIG. 4 is a schematic sectional illustration of the aircraft propulsion system with the nacelle doors in an open position.

The nacelle 22 is configured with one or more nacelle doors 70, which may be referred to as "thrust reverser doors", "D-duct doors" and/or "C-duct doors". These nacelle doors 70 may be configured as "gullwing" style doors as shown in FIG. 4. Each of the nacelle doors 70 of FIGS. 3 and 4, for example, is pivotally connected to the pylon 52 through a respective one of the hinge beams 56, where each hinge beam 56 has a respective pivot axis. This pivot axis is substantially parallel to the pylon 52 and the axial centerline 34 of the propulsion system 20.

Each of the nacelle doors 70 includes portions of the outer and the inner structures 26 and 28. Each nacelle door 70 of FIGS. 3 and 4 include a respective one of the translating sleeve segments 44 and a respective half of the inner structure 28. This half of the inner structure 28 includes a (e.g., half) portion 72 of the core cowl 64, a (e.g., half) portion 74 of the first bifurcation 66, a (e.g., half) portion 76 of the second bifurcation 68, and an extension portion 78. Each of the nacelle doors 70 also includes a respective one of the hinge beams 56 and a respective one of the track beams 58.

Figure 5:
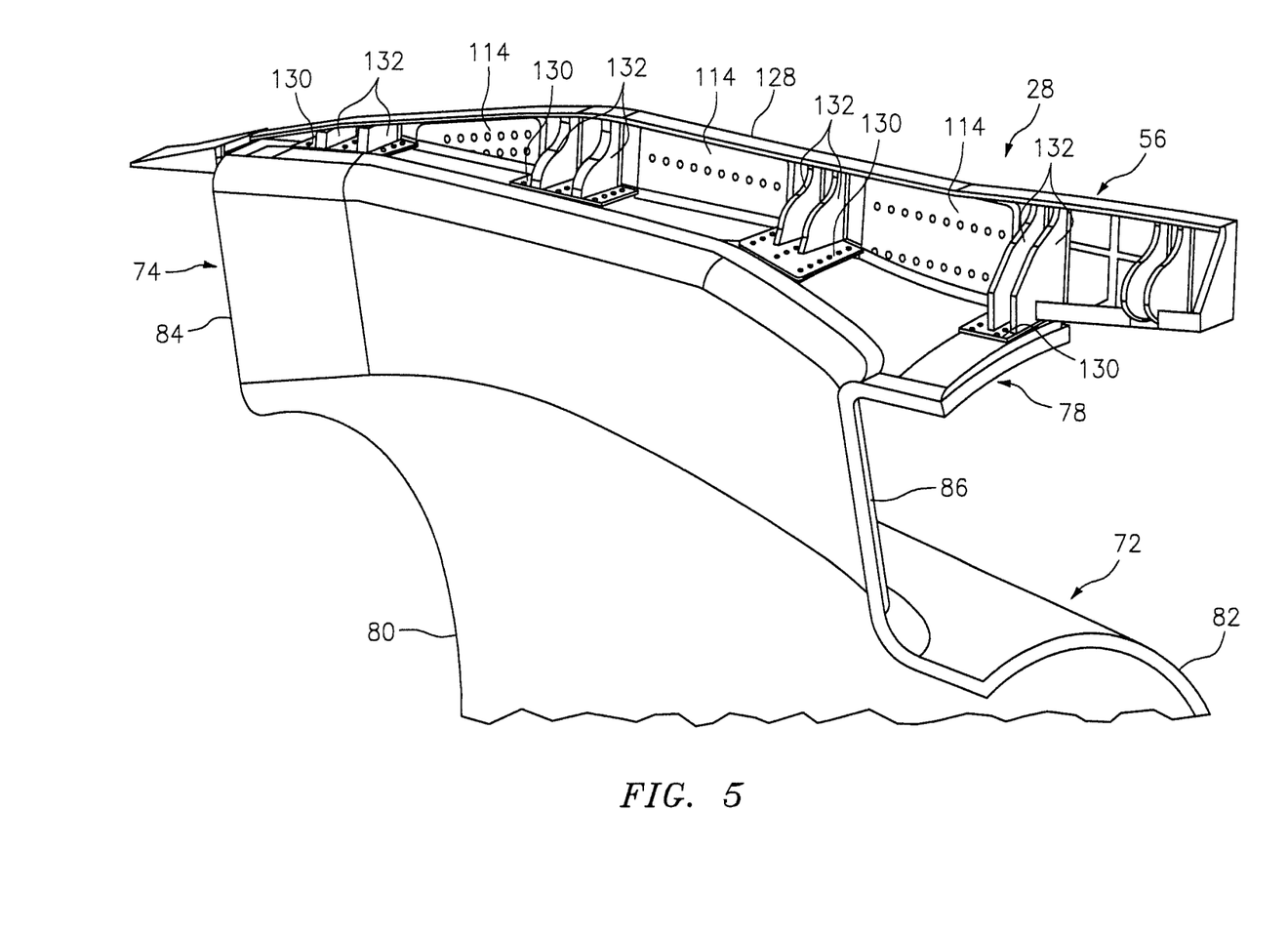
FIG. 5 is a perspective illustration of an inner structure for a nacelle of the aircraft propulsion system and a hinge beam.

Referring to FIGS. 3 and 5, the core cowl portion 72 extends axially along the centerline 34 between a core cowl first end 80 and a core cowl second end 82. The core cowl portion 72 extends circumferentially about the centerline 34 between the first bifurcation portion 74 and the second bifurcation portion 76.

The first bifurcation portion 74 extends axially along the centerline 34 between a first bifurcation first end 84 and a first bifurcation second end 86. The first bifurcation first end 84 may be substantially axially aligned with the core cowl first end 80. The first bifurcation second end 86 may be axially recessed from the core cowl second end 82. The first bifurcation portion 74 projects radially out (e.g., upward) from the core cowl portion 72 to the extension portion 78.

The second bifurcation portion 76 extends axially along the centerline 34 between a second bifurcation first end and a second bifurcation second end. The second bifurcation first end may be substantially axially aligned with the core cowl first end 80. The second bifurcation second end may be axially recessed from the core cowl second end 82. The second bifurcation portion 76 projects radially out (e.g., downward) from the core cowl portion 72 to a radial outer distal end, which is connected to a respective one of the track beams 58.

Figure 6:
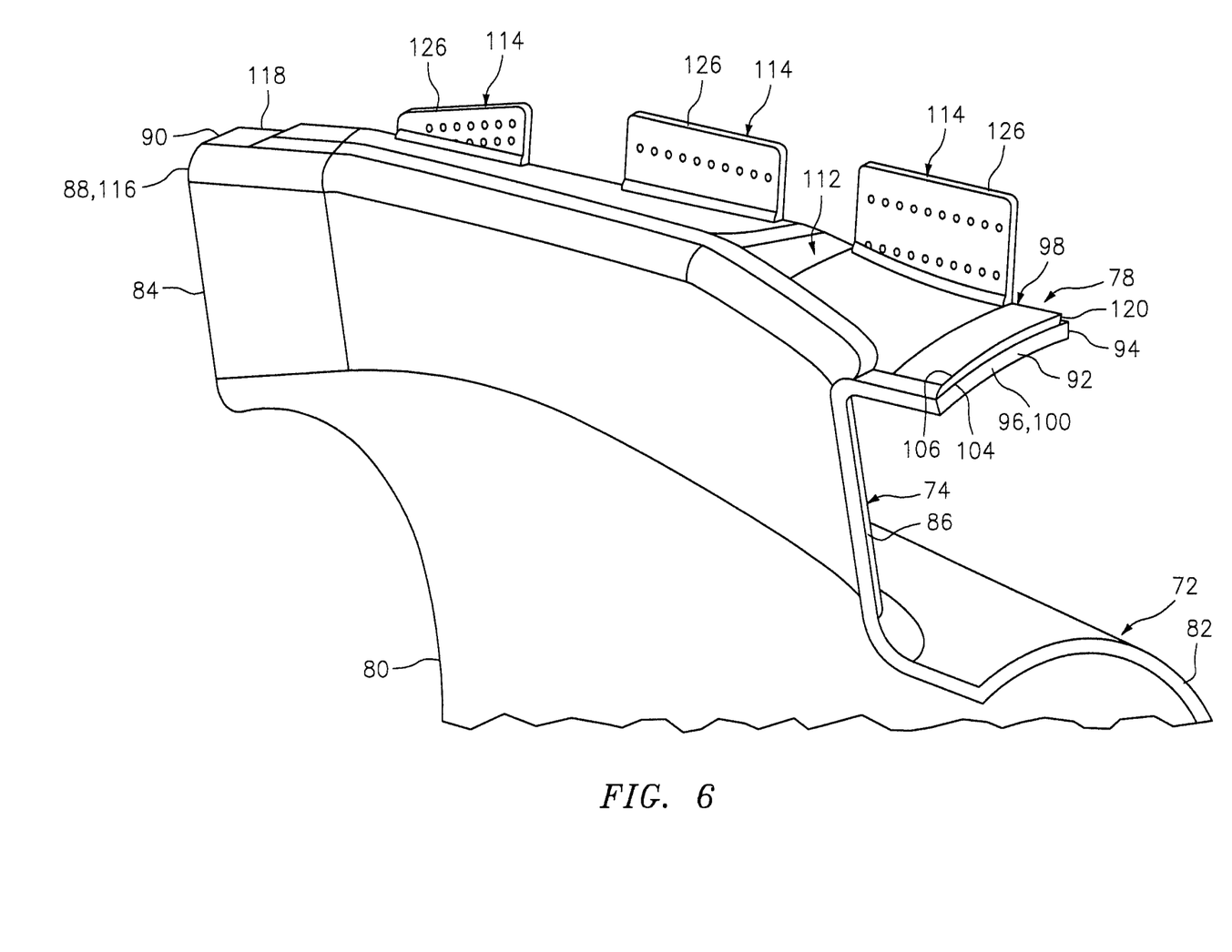
FIG. 6 is a perspective illustration of the inner structure for the nacelle.
Figure 7:
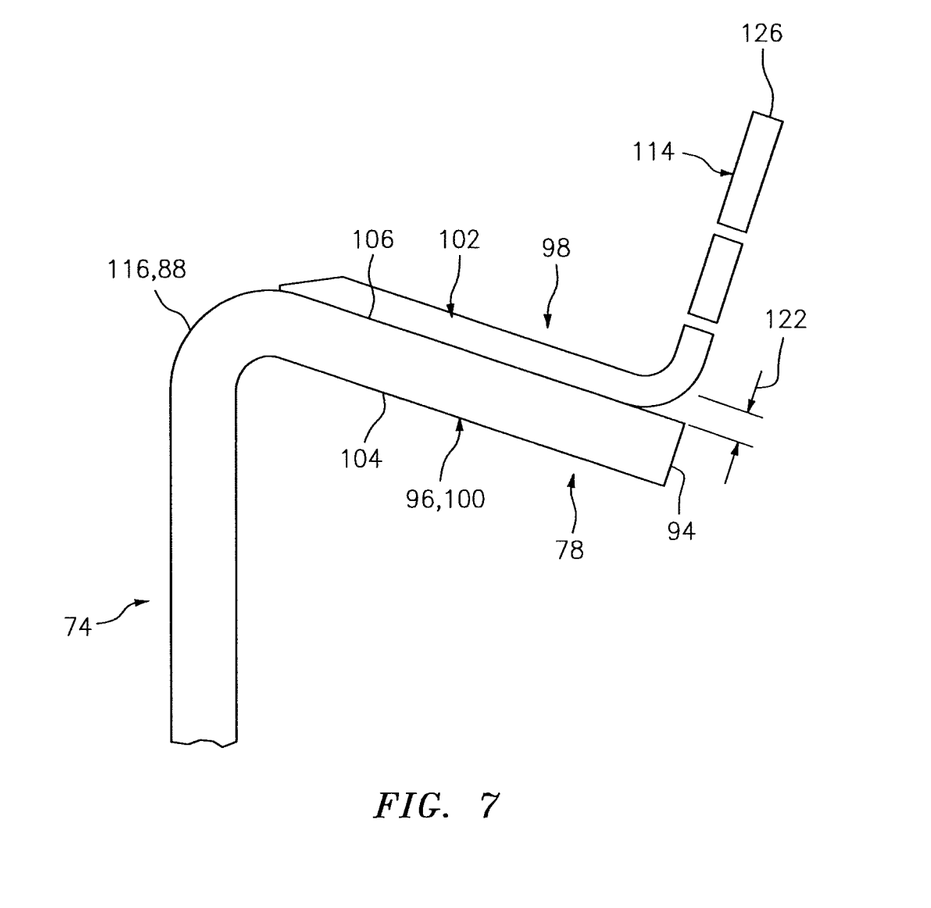
FIG. 7 is a partial, cross-sectional illustration of bifurcation and extension portions of the inner structure.

Referring to FIGS. 6 and 7, the extension portion 78 extends axially along the centerline 34 and at least a length of an outer radial end 88 of the first bifurcation portion 74 between an extension portion first end 90 and an extension portion second end 92. The extension portion first end 90 may be substantially axially aligned with the core cowl first end 80 and/or the first bifurcation first end 84. The extension portion second end 92 may project axially aft of the first bifurcation second end 86. In addition, the extension portion 78 may be substantially axially aligned with the core cowl second end 82. The extension portion 78 projects laterally (e.g., circumferentially or tangentially) out from the outer radial end 88 of the first bifurcation portion 74 to a lateral distal end 94 of the extension portion 78. The extension portion 78 is thereby radially outboard of and laterally extends over (e.g., partially circumscribes) the core cowl portion 72; see also FIG. 3.

The extension portion 78 includes an inner member 96 and an outer member 98, which is configured as and is referred to below as a structural reinforcement for the inner member 96 of the extension portion 78. The inner member 96 is formed from at least one acoustic panel 100, which may also form one or more of the other nacelle door portions 82, 84, 86. However, in other embodiments, one or more of the nacelle door portions 82, 84, 86 may be formed from at least one acoustic panel that is discrete from the inner member 96. In such embodiments, the acoustic panel forming the first bifurcation portion 74 may be attached to the acoustic panel of the extension portion 78 through a corner fitting or otherwise.

Figure 8:
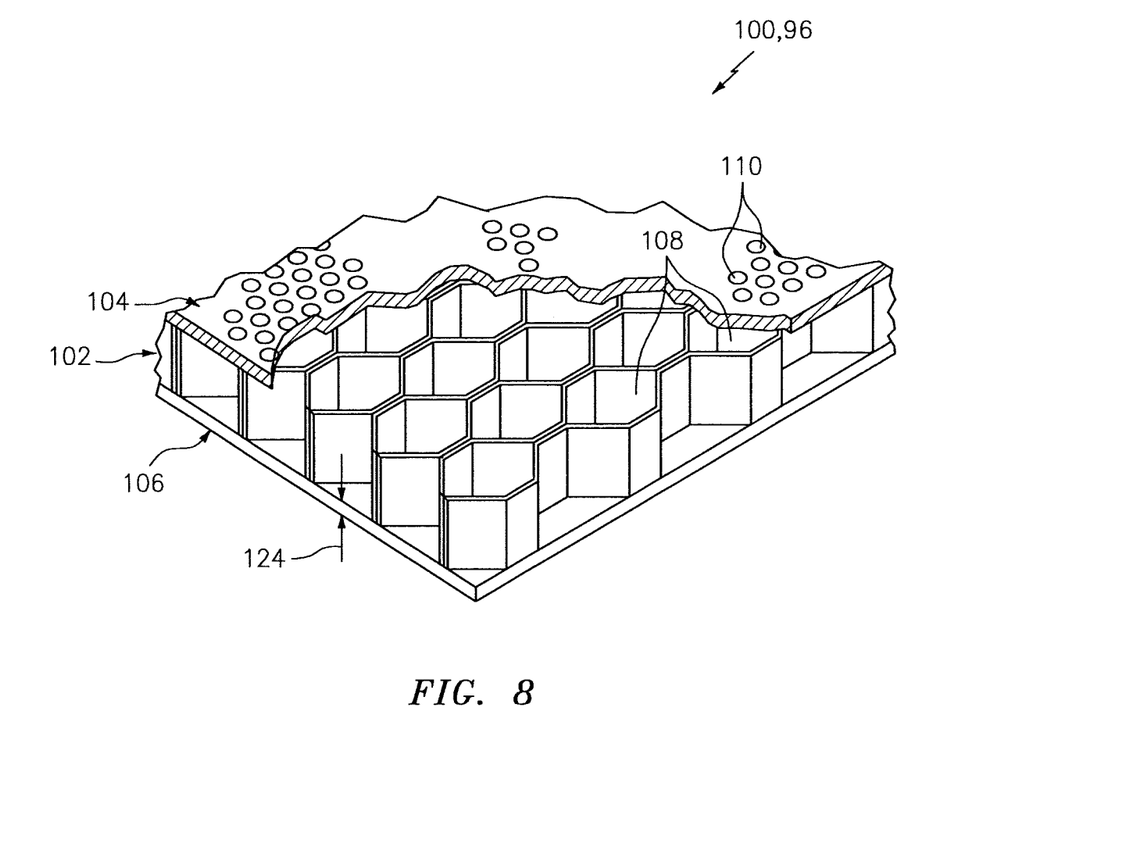
FIG. 8 is a perspective, cutaway illustration of a portion of an acoustic panel.

FIG. 8 illustrates an exemplary embodiment of an acoustic panel 100. This acoustic panel 100 is configured as a single degree-of-freedom acoustic panel. The acoustic panel(s) forming one or more of the nacelle door portions, however, may alternatively be configured as a double degree-of-freedom acoustic panel, or any other type of acoustic panel. The exemplary acoustic panel 100 of FIG. 6 includes a cellular (e.g., honeycomb, or otherwise) core 102 between and bonded (e.g., fused, welded, brazed, adhered or otherwise) to a perforated first skin 104 and a second skin 106. The cellular core 102 is configured to form a plurality of (e.g., discrete/fluidly decoupled) cavities 108 between the first and the second skins 104 and 106. Each of these cavities 108 is fluidly coupled with one or more of the perforations 110 in the first skin 104. Other exemplary embodiments of an acoustic panel are disclosed in U.S. Publication No. 2015/0367953 to Yu et al., U.S. Publication No. 2015/0292413 to Soria et al., U.S. Publication No. 2011/0200786 to Douglas, each of which are hereby incorporated herein by reference in its entirety. The present disclosure, of course, is not limited to any particular acoustic panel configurations.

The acoustic panel 100 forming at least the inner member 96 is a composite panel. The first skin 104 and the second skin 106, for example, are each formed from fiber reinforced composite material. Such fiber reinforced composite material includes fibrous material within a polymer matrix. Examples of a suitable fibrous material include, but are not limited to, carbon fiber, fiberglass, aramid fiber (e.g., Kevlar® fiber) as well as mixtures of multiple of the foregoing fibers. This fibrous material, before impregnation with the polymer matrix, may be in the form of sheets of fibrous material; e.g., woven sheets of fibrous materials, fiber mat, etc. Examples of a suitable polymer matrix include, but are not limited to, a thermoset such as epoxy resin or a thermoplastic such as plastic. The skins 104 and 106 of the present disclosure, of course, are not limited to the foregoing exemplary materials.

The cellular core 102 may similarly be formed from a fiber reinforced composite material. Alternatively, the cellular core 102 may be formed from another material such as metal. Examples of a suitable metal include, but are not limited to, aluminum (Al), titanium (Ti), nickel (Ni) or an alloy of one or more of the foregoing metals. The cellular core 102 of the present disclosure, of course, is not limited to the foregoing exemplary materials.

Referring to FIGS. 6 and 7, the structural reinforcement 98 may have an L-bracket type configuration. The structural reinforcement 98 of FIGS. 6 and 7, for example, includes a reinforcement base 112 and one or more reinforcement flanges 114. The reinforcement base 112 is at least between (A) the lateral distal end 94 of the extension portion 78 and (B) a corner 116 between the extension portion 78 and the first bifurcation portion 74. The reinforcement base 112, for example, extends laterally from the corner 116 to the lateral distal end 94 and, thus, laterally along a width of the inner member 96; e.g., the acoustic panel 100. In other embodiments, however, the reinforcement base 112 may project beyond one or both of the foregoing locations 94, 116.

The reinforcement base 112 extends axially along at least twenty-five percent (25%) of a length of the inner member 96; e.g., the acoustic panel 100. The reinforcement base 112 of FIG. 6, for example, extends axially along about ninety percent (~90%) of the length between a base first end 118 and a base second end 120. The base first end 118 may be axially offset (e.g., aft of) the extension portion first end 90. The base second end 120 may be substantially axially aligned with the extension portion second end 92.

At least a portion, or all of, the reinforcement base 112 has a thickness 122 (e.g., in the radial direction; see FIG. 7) that is greater than a thickness 124 (e.g., in the radial direction) of the skin 106; see FIG. 8. However, in other embodiments, the thickness 122 may be substantially equal to or less than the thickness 124. In particular, the thickness 124 may be made from additional plies and may be determined by the magnitude of the structural load to be handled.

The reinforcement base 112 is bonded to the second skin 106. Alternatively, in other embodiments, the reinforcement base 112 may include/take the place of the second skin 106.

The reinforcement flanges 114 are disposed at (e.g., on, adjacent, or proximate) the lateral distal end 94 of the extension portion 78. The reinforcement flanges 114 are disposed axially along the reinforcement base 112, and axially separated from one another. The reinforcement flanges 114 project radially out from the base 112 to respective distal radial ends 126.

The structural reinforcement 98 is formed integral with the acoustic panel 100. The structural reinforcement 98 and the acoustic panel 100 thereby are included in a monolithic body. The structural reinforcement 98, for example, may be formed from fiber reinforced composite material similar to that of the second skin 106. Fibrous material for the structural reinforcement 98, for example, may be laid up with fibrous material during the acoustic panel 100 formation. This fibrous material may be pre-impregnated fibrous material and/or may be impregnated with the polymer matrix during formation. The polymer matrix may subsequently be cured to form the extension portion 78. Of course, in other embodiments, the acoustic panel 100 may be formed discretely from the extension member and the extension member may thereafter be bonded to the acoustic panel 100. The present disclosure, however, is not limited to the foregoing exemplary formation techniques.

Figure 9:
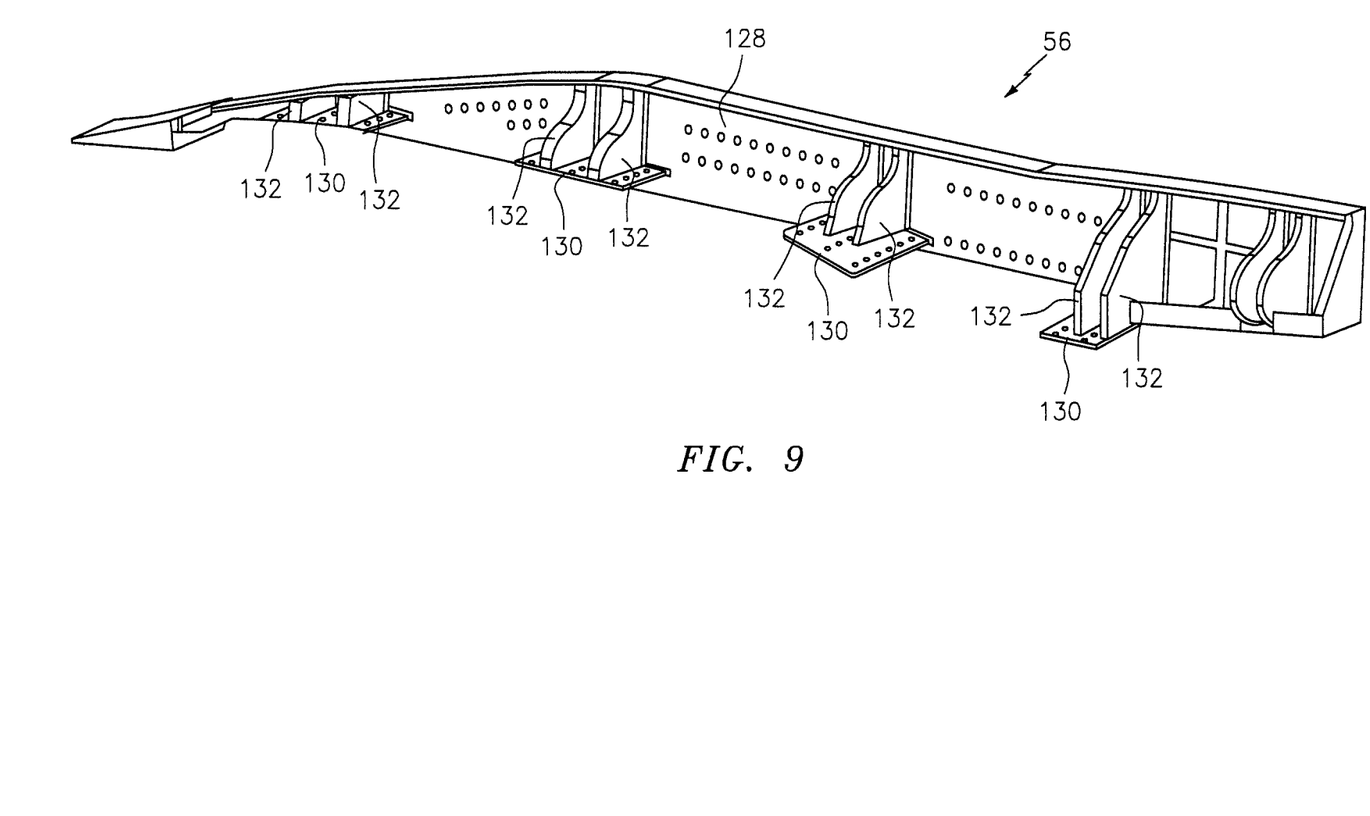
FIG. 9 is a perspective illustration of the hinge beam.
Figure 10:
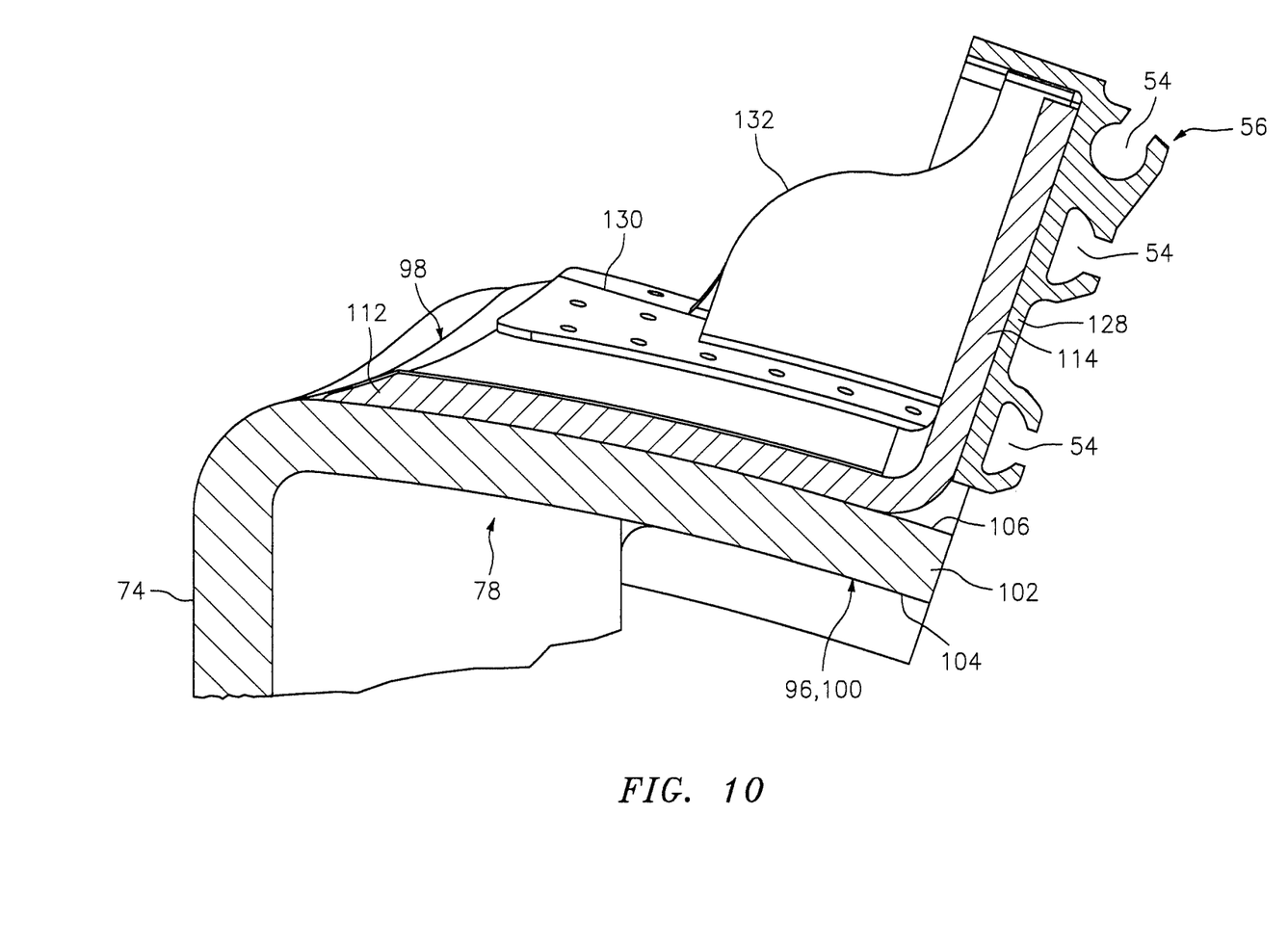
FIG. 10 is a partial, cross-sectional illustration of the bifurcation and extension portions of the inner structure with the hinge beam.

Referring to FIGS. 9 and 10, each hinge beam 56 includes a beam 128 and one or more flange mounts 130. Each hinge beam 56 also includes one or more hinge gussets 132. The beam 128 extends axially along the centerline 34 (see FIG. 2), and includes and provides a base for the one or more rails 54. The flange mounts 130 project laterally out from the beam 128, and are disposed opposite the rails 54. The hinge gussets 132 respectively extend between the beam 128 and the flange mounts 130. Each of these hinge gussets 132 is configured to be pivotally connected (e.g., pinned) to the pylon 52 (see FIG. 3). The hinge beam 56 may be formed from any suitable material. For example, the hinge beam 56 may be formed from a metal such as, but not limited to, aluminum (Al), titanium (Ti), nickel (Ni) or an alloy of one or more of the foregoing metals.

Referring to FIGS. 5 and 10, the mount flanges 130 respectively project between (e.g., mesh with) the reinforcement flanges 114. The reinforcement flanges 114 are attached (e.g., mechanically fastened and/or bonded) to a base of the hinge beam 56. The hinge beam/mount flanges 130 are attached to the reinforcement base 112.

Figure 11:
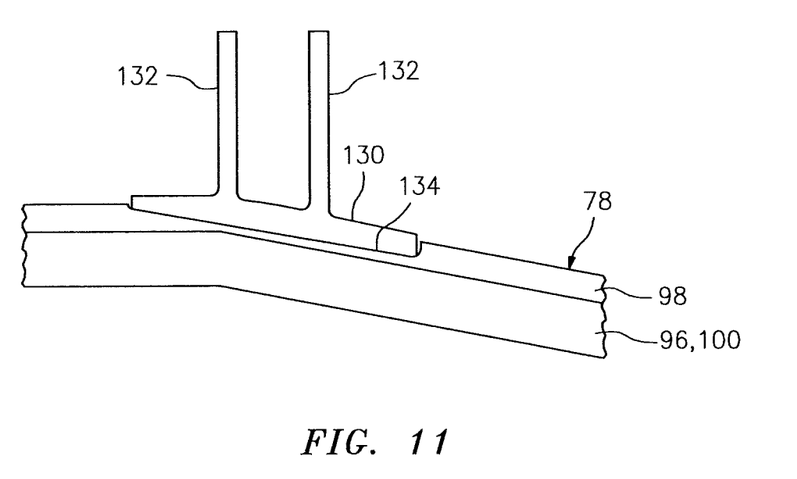
FIG. 11 is a side sectional illustration of an alternative extension portion with an alternative hinge beam.
Figure 12:
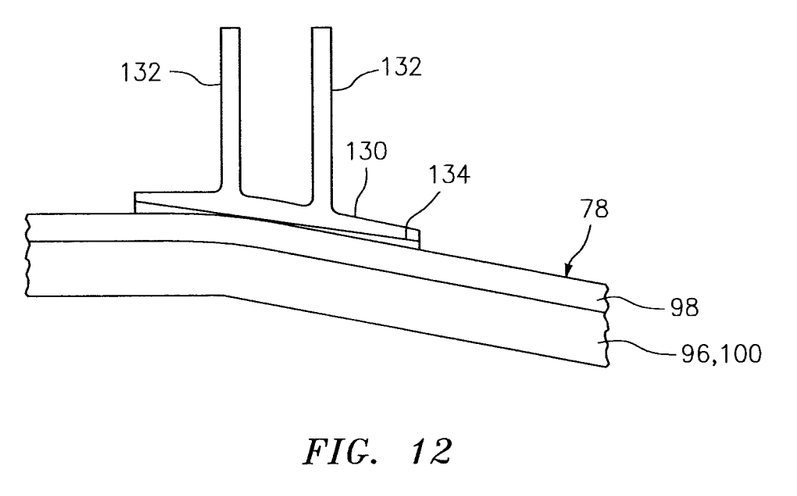
FIG. 12 is a side sectional illustration of another alternative extension portion with another alternative hinge beam.

In some embodiments, referring to FIGS. 11 and 12, the reinforcement base 112 may include at least one flat 134; e.g., a localized flat region. This flat 134 may be recessed into the reinforcement base 112 as shown in FIG. 11. Alternatively, the flat 134 may be formed by a material buildup that projects out from the reinforcement base 112 as shown in FIG. 12.

Figure 13:
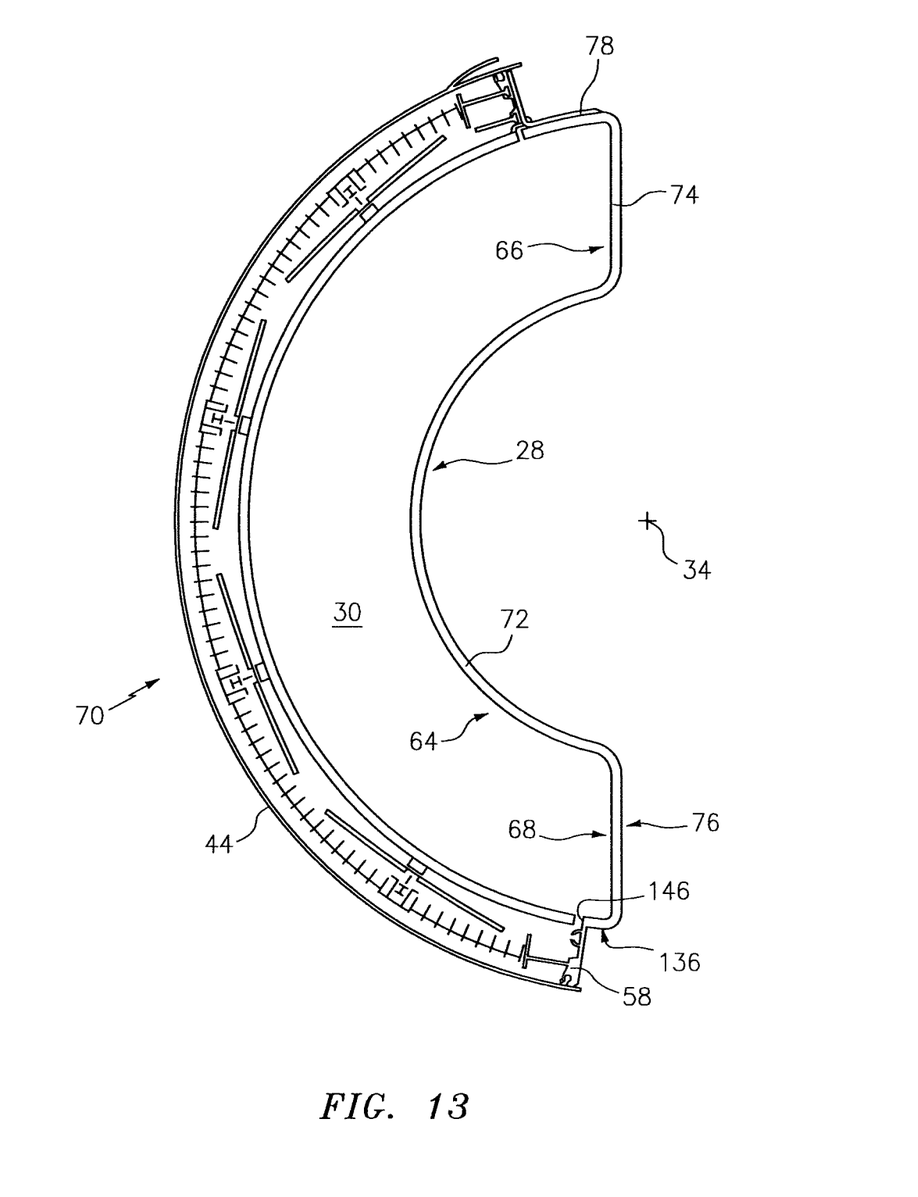
FIG. 13 is a schematic sectional illustration of another nacelle door for an aircraft propulsion system.
Figure 14:
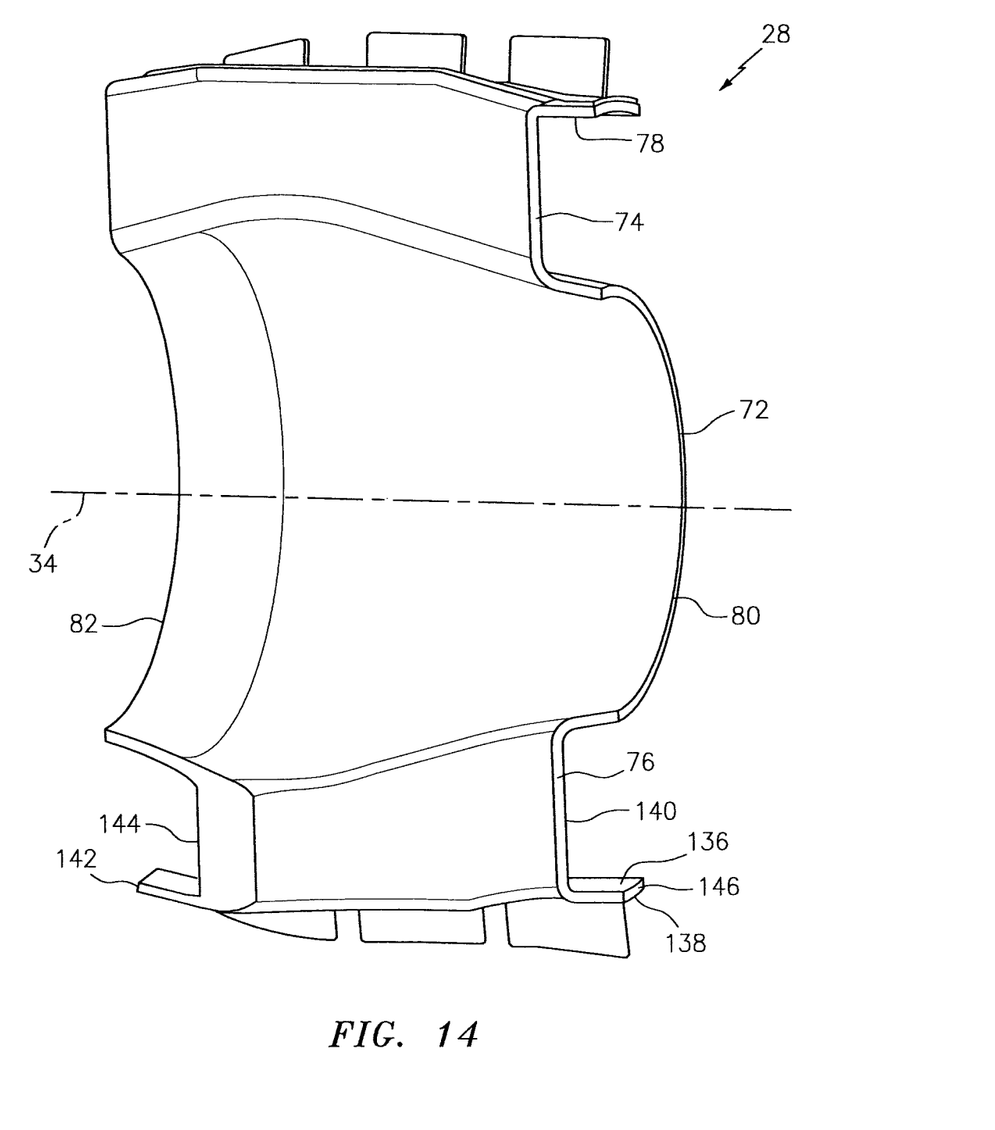
FIG. 14 is a perspective illustration of an inner structure for the nacelle door of FIG. 13.

In some embodiments, referring to FIGS. 13 and 14, each nacelle door 70 may also (or alternatively) include an extension portion 136. This extension portion 136 may have a similar configuration to the extension portion 78 described above. The extension portion 136 of FIGS. 13 and 14, for example, extends axially along the centerline 34 and at least a length of an outer radial end of the second bifurcation portion 76. An extension portion first end 138 may be substantially axially aligned with the core cowl first end 80 and/or a second bifurcation first end 140. An extension portion second end 142 may project axially aft of a second bifurcation second end 144. In addition, the extension portion 136 may be substantially axially aligned with the core cowl second end 82. The extension portion 136 projects laterally out from the outer radial end of the second bifurcation portion 76 to a lateral distal end 146 of the extension portion 136. The extension portion 136 is thereby radially outboard of and laterally extends over (e.g., partially circumscribes) the core cowl portion 72.

The extension portion 136 is configured with a similar construction to that described above with respect to the extension portion 78, and shown in FIGS. 7 and 8. With this configuration, the extension portion 136 may provide additional sound attenuation and structural mounts.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A nacelle for an aircraft propulsion system, comprising:
a core cowl portion, a bifurcation portion and an extension portion;
the core cowl portion extending about a centerline to the bifurcation portion;
the bifurcation portion connected to and extending radially between the core cowl portion and the extension portion;
the extension portion projecting out from the bifurcation portion and circumferentially extending over the core cowl portion, and the extension portion including an acoustic panel and a structural reinforcement;
the acoustic panel including a cellular core between a perforated face skin and a back skin, wherein the face skin is radially inboard of the back skin;
the structural reinforcement bonded to the back skin and structurally reinforcing the acoustic panel;
the structural reinforcement comprising a base and a flange, the base bonded to the back skin, and the flange projecting radially out from the base;
a hinge beam attached to the base and the flange; and
the hinge beam including a beam, a flange mount and a hinge gusset extending between the beam and the flange mount, the beam mechanically fastened to the flange, and the flange mount mechanically fastened to the base.

2. The nacelle of claim 1, wherein the back skin has a first thickness and the structural reinforcement has a second thickness that is greater than the first thickness.

3. The nacelle of claim 1, wherein the structural reinforcement is at least between a distal circumferential end of the extension portion and a corner between the extension portion and the bifurcation portion.

4. The nacelle of claim 1, wherein the structural reinforcement circumferentially extends along a width of the extension portion.

5. The nacelle of claim 1, wherein the structural reinforcement axially extends along at least twenty-five percent of a length of the extension portion.

6. The nacelle of claim 1, wherein the structural reinforcement further comprises a second flange that projects radially out from the base, and the flange and the second flange are disposed axially along the base.

7. The nacelle of claim 1, further comprising a translating sleeve segment slidingly connected to the hinge beam.

8. The nacelle of claim 1, wherein the extension portion comprises composite material and the hinge beam comprises metal.

9. The nacelle of claim 1, wherein the structural reinforcement comprises composite material.

10. The nacelle of claim 1, further comprising:
a second bifurcation portion connected to and projecting radially out from the core cowl portion;
wherein the core cowl portion extends about the centerline between the bifurcation portion and the second bifurcation portion.

11. The nacelle of claim 10, further comprising:
a translating sleeve segment extending about the centerline and connected to the extension portion and the second bifurcation portion;
wherein a flowpath is formed circumferentially between the bifurcation portion and the second bifurcation portion, and radially between the core cowl portion and the extension portion and the translating sleeve segment.

12. The nacelle of claim 10, further comprising:
a second extension portion projecting out from the second bifurcation portion and circumferentially extending over the core cowl portion;
the second extension portion including a second acoustic panel;
the second acoustic panel including a cellular core between a perforated second face skin and a second back skin, wherein the second face skin is radially inboard of the second back skin.

13. The nacelle of claim 12, wherein the second extension portion includes a second structural reinforcement, and the second structural reinforcement is bonded to the second back skin and structurally reinforcing the second acoustic panel.

14. A nacelle for an aircraft propulsion system, comprising:
an inner fixed structure extending along a centerline and including a bifurcation portion and an extension portion, the extension portion projecting circumferentially out from a radial outer end of the bifurcation portion, wherein the extension portion comprises an acoustic panel and a composite structural reinforcement bonded to and structurally reinforcing the acoustic panel;
a metal hinge beam mechanically attached to the structural reinforcement; and
a translating sleeve segment axially translatably connected to the hinge beam, wherein a bypass flowpath is formed radially within the extension portion and the translating sleeve segment and circumferentially next to the bifurcation portion;
the structural reinforcement comprising a base and a flange, the base bonded to a back skin of the acoustic panel, and the flange projecting radially out from the base;
the structural reinforcement further comprising a second flange that projects radially out from the base, and the flange and the second flange disposed axially along the base;
the hinge beam comprising a beam and a mounting flange;
the beam mechanically attached to the flange and the second flange, and the translating sleeve segment axially translatably connected to the beam; and
the mounting flange projecting out from the beam, the mounting flange axially between the flange and the second flange, and the mounting flange mechanically attached to the base.

* * * * *